US007233973B2

(12) United States Patent
Melet et al.

(10) Patent No.: US 7,233,973 B2
(45) Date of Patent: Jun. 19, 2007

(54) EVOLVING INTERACTIVE DIALOG BOX FOR AN INTERNET WEB PAGE

(75) Inventors: Stone J. Melet, San Francisco, CA (US); Todd B. Melet, Chapel Hill, NC (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 11/090,024

(22) Filed: Mar. 28, 2005

(65) Prior Publication Data

US 2005/0204279 A1 Sep. 15, 2005

Related U.S. Application Data

(63) Continuation of application No. 09/824,648, filed on Apr. 4, 2001, now Pat. No. 6,917,961, which is a continuation-in-part of application No. 09/537,569, filed on Mar. 30, 2000, now Pat. No. 6,615,238.

(51) Int. Cl.
*G06F 15/16* (2006.01)
(52) U.S. Cl. .................. 709/203; 709/217; 709/219; 707/10; 715/501.1; 715/513
(58) Field of Classification Search ........ 709/200–203, 709/206–207, 217–219, 227–229; 707/10; 715/501.1, 513, 517, 526; 705/26–27, 1, 705/39, 64
See application file for complete search history.

(56) References Cited

U.S. PATENT DOCUMENTS

| 5,778,368 | A | 7/1998 | Hogan et al. ............... 709/203 |
| 5,787,254 | A * | 7/1998 | Maddalozzo et al. ........ 709/228 |
| 5,802,299 | A | 9/1998 | Logan et al. ................ 709/218 |
| 5,819,092 | A * | 10/1998 | Ferguson et al. ............. 705/39 |
| 5,948,054 | A | 9/1999 | Nielsen ....................... 709/203 |
| 6,029,141 | A | 2/2000 | Bezos et al. .................. 705/27 |
| 6,167,426 | A | 12/2000 | Payne et al. ................. 709/203 |
| 6,266,684 | B1 | 7/2001 | Kraus et al. ................. 715/513 |
| 6,285,998 | B1 | 9/2001 | Black et al. |
| 6,307,573 | B1 | 10/2001 | Barros |
| 6,332,150 | B1 | 12/2001 | Khan et al. |
| 6,407,759 | B1 | 6/2002 | Kanungo et al. ........... 715/809 |
| 6,493,733 | B1 * | 12/2002 | Pollack et al. .............. 715/513 |

(Continued)

*Primary Examiner*—Bharat Barot
(74) *Attorney, Agent, or Firm*—Schwegman, Lundberg, Woessner and Kluth P.A.

(57) ABSTRACT

A host Web page includes an evolving interactive dialog box wherein an Internet user may enter user data to be processed. When the user completes entering user data in a first revolution of the interactive dialog box, the first revolution is replaced with a second revolution of the evolving interactive dialog box without disturbing or affecting any other part of the host Web page being displayed. Beneficially, the first and second revolutions may be communicated to a user computer together with and at a same time as the host Web page. Also, the second revolution may include a variety of data which is selected or customized to match the user data submitted in the first revolution. Each revolution of the evolving interactive dialog box may be comprised of any combination of general textual data entry fields, category (pull-down) menus, contact information data entry fields, and opt-in/opt-out buttons. The evolving interactive dialog box may also include dynamically selectable features, such as font type, font size, font color, box shape, box dimension (s), background colors, foreground colors, etc.

15 Claims, 12 Drawing Sheets

U.S. PATENT DOCUMENTS

| | | |
|---|---|---|
| 6,615,238 B1 | 9/2003 | Melet et al. ................. 709/203 |
| 6,631,402 B1 | 10/2003 | Devine et al. .............. 709/217 |
| 6,701,343 B1 | 3/2004 | Kenyon ...................... 709/217 |
| 6,721,795 B1 * | 4/2004 | Eldreth ....................... 709/232 |
| 2002/0107701 A1 * | 8/2002 | Batty et al. .................... 705/1 |

* cited by examiner

All it takes is two simple steps to apply:

Step 1: Fill out your application.
Step 2: Select the category sponsor you'd like to have in your AskBox.

STEP 1  Fill out your application

Web Site Information
Enter a name for your site and provide its URL address. You can give an estimate of how many different people visit your site each month and how many times all of the pages on your site are viewed each month (page views)

| Site Name: | Mr/Ms | First | | Last | |
|---|---|---|---|---|---|

URL:

Confirm URL:

Primary Contact
Enter the contact information for the person who will receive all communications concerning each AskBox affiliate program.

Name:

Title:

Phone: Fax:

E-Mail:

Confirm E-Mail:

Mailing Address
This will be the primary contact's mailing address.

Address 1:

Address 2:

City:

State: Select a State

Postal Code:

Country: Select a Country

Fig. 10a

AskBox Properties

Choose the dimensions, fonts, and color schemes for your AskBox

| | | | |
|---|---|---|---|
| Box Dimensions: | [120H X 120W ▼] | | |
| Font Type: | [Arial ▼] | | |
| Font Size: | [10px ▼] | | |
| Title Text (15 characters maximum) | [________] | Align: | [Left ▼] |
| Body Text | [________] | Align: | [Left ▼] |
| Boiler Text (50 characters maximum) | [________] | Align: | [Left ▼] |
| Footer Text (35 character maximum) | [________] | Align: | [Left ▼] |
| Pull Down Field Text (20 characters maximum) | [________] | | |
| Question Box Text (30 characters maximum) | [________] | | |
| Email Text (50 characters maximum) | [________] | Align: | [Left ▼] |
| Opt-In Text (50 characters maximum) | [________] | Align: | [Left ▼] |
| Send Button Text (20 characters maximum) | [________] | | |
| Confirmation Text (75 characters maximum) | [________] | | |
| Return Link Text (50 characters maximum) | [________] | | |
| Include Pull Down Field: | [Yes ▼] | | |
| Include Question Box: | [Yes ▼] | | |
| Include Email Field: | [Yes ▼] | | |
| Include Opt-in Field: | [Yes ▼] | | |
| Show Confirmation Logo: | [Yes ▼] | | |

EVOLVING INTERACTIVE DIALOG BOX FOR AN INTERNET WEB PAGE

CROSS REFERENCES TO RELATED APPLICATIONS

This application is a Continuation of prior application Ser. No. 09/824,648, filed Apr. 4, 2001 now U.S. Pat. No. 6,917,961, which is a continuation-in-part of U.S. patent application Ser. No. 09/537,569, filed Mar. 30, 2000 in the names of Stone J. Melet and Todd B. Melet, now U.S. Pat. No. 6,615,238, the entirety of which is hereby incorporated by reference for all purposes as if fully set forth herein.

BACKGROUND OF THE INVENTION

1) Field of the Invention

This invention pertains to the field of the Internet and, more specifically, to a system and method for communicating information over the Internet.

2) Description of the Related Art

To facilitate understanding of the background and preferred embodiments of the invention, the following terms and acronyms are used through this specification:

Client-Server. A model of interaction in a distributed computer system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Dialog Box. A window or box that appears on a display screen to present information and request user input or user data.

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Hypertext System. A computer-based informational system in which documents (and possibly other types of data entities) are linked together via hyperlinks to form a user-navigable "Web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "ASKFORFREE-.COM®," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET causes the server to return the document or file located at the specified URL (see below).

URL (Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol. For example, if HTTP is specified as the protocol, the browser will use the HTTP default port of 80.

DHTML (Dynamic Hypertext Markup Language). An enhanced version of HTML which includes dynamic presentation features such as cascading style sheets (CSS), which enhance a Web page designer's control over the placement of specific elements in a Web page.

There is a constant challenge for Internet Web site operators to attract visitors and to create "stickiness" and build loyalty to their Web sites. Accordingly, in an effort to build and maintain visitor loyalty, Web site operators provide a variety of services to their visitors via the site's Web pages. Such services may include opinion polls, surveys, contests in which the Web site visitors may participate, and "help" and "contact us" services where a visitor may obtain additional information or communicate feedback with a Web site operator.

In the past, such services have been made available to visitors through hyperlinks, such as buttons, embedded on the Web site's home Web page. As is well known, when an Internet user viewing a particular Web page "clicks on" or selects a hyperlink on a Web page that the user is currently viewing (the "host" Web page), the user's Web browser is directed away from that host Web page, and a new, linked-to Web page is loaded into the Web browser in its place. Alternatively, the user's computer may open a second Web browser window containing the linked-to Web page, covering the host Web page on the user's computer display screen. Or, in some cases, a "pop-up box" opens on the user's computer display screen, covering all or part of the host Web page.

Thus, when a user clicks on a hyperlink to take advantage of any of these services included in a host Web page which the user is viewing, the user's view of the host Web page disappears, is blocked, or is otherwise significantly altered.

However, in many cases, the provider of the host Web page does not want to have its host Web page disappear or be covered on the user's computer display screen, or even to have the user's attention turned away from the host Web page. This may be the case where the host Web page includes paid advertisement banners and/or paid-for embedded links to other Web pages, such that the provider of the host Web page may lose revenue if the user leaves the host Web page or the host's Web site. Also, it is undesirable for the user to have to wait until a new Web page can be downloaded into their computer's browser to take advantage of these services, such as "help" or "contact us" etc.

In response to these needs, U.S. patent application Ser. No. 09/537,569, the entirety of which is hereby incorporated by reference for all purposes as if fully set forth herein, discloses an evolving interactive dialog box for an Internet Web page. After the user enters data into a user data entry box of a first revolution of the evolving interactive dialog box, the first revolution is replaced "in place" with a second revolution without disturbing or affecting any other part of the host Web page being displayed by the user's computer. Thus, the user is not driven or distracted away from the host Web site while submitting user data via the Internet to be processed. And, the user is not forced to wait while a new Web page is downloaded into their computer's browser.

The present inventors have subsequently discovered that the evolving interactive dialog box first disclosed in U.S. patent application Ser. No. 09/537,569 can be very useful in a number of different Internet applications. The inventors have also discovered that the utility of the evolving interactive dialog box can be especially enhanced in certain variants and/or if certain additional features are incorporated therein.

Accordingly, it would be advantageous to provide an improved evolving interactive dialog box. Other and further objects and advantages will appear hereinafter.

SUMMARY OF THE INVENTION

The present invention comprises a method and system for receiving user data from a user computer via the Internet.

In one aspect of the invention, a host Web page includes an improved evolving interactive dialog box. Beneficially, the evolving interactive dialog box includes at least a first revolution and a second revolution. After the user provides user data or a request for information via the first revolution of the evolving interactive dialog box, the first revolution is replaced with a second revolution without disturbing or affecting any other part of the host Web page being displayed by the user's computer. Thus, a service may be provided via the interactive dialog box without altering the user's view of the remainder of the host Web page.

In another aspect of the invention, the second revolution may consist of predetermined content, such as a standard message, logo, image, etc. such that both first and second revolutions may be communicated to a user computer at a same time when the user computer downloads a host Web page.

In yet another aspect of the invention, the second revolution of an evolving interactive dialog box may include one or more customized components selected based upon the user data provided in the first revolution. Beneficially, such components may include text data, one or more images, streaming multimedia files, advertisements, and/or hyperlinks to one or more URLs (e.g., for Web pages) which are selected based on the user data provided in the first revolution.

In a further aspect of the invention, an evolving interactive dialog box includes dynamic characteristics which are easily changed to match a Web page in which the box is displayed. Such characteristics may include text font, text color, box shape, and background and foreground colors of the box.

DESCRIPTION OF THE PREFERRED EMBODIMENTS

Figure 1A:
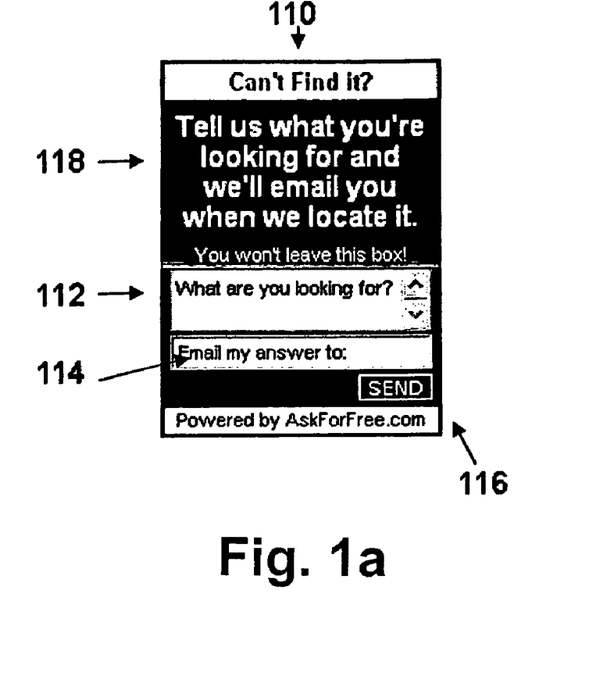
FIGS. 1A and 1B show a first preferred embodiment of an evolving interactive dialog box for a Web page.
Figure 1B:
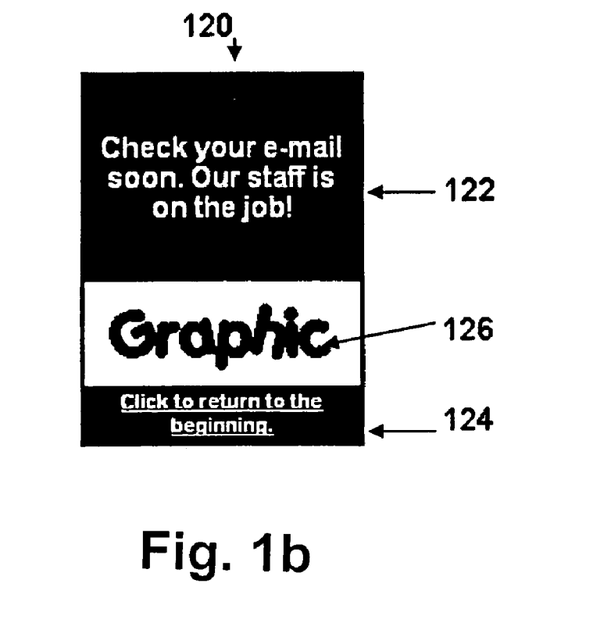

FIGS. 1A and 1B show a first preferred embodiment of an evolving interactive dialog box 100 for a host Web page. In the embodiment shown in FIGS. 1A–B, the evolving interactive dialog box 100 has two evolutionary states, each comprising a dialog box and each herein referred to as a "revolution," 110 and 120.

The first revolution 110 includes a first data entry field 112, a second data entry field 114, a "Send" button 116, and provider data field 118. The provider data field 118 may be a simple standard text message. Beneficially, the first data entry field 112 is a text entry box wherein a user may enter user data, and the second data entry field 114 is a text entry box wherein a user supplies an e-mail address where the user may receive e-mail.

When a user clicks on the "Send" button 116, the first revolution 110 of the evolving interactive dialog box 100 is replaced in place in a host Web page with the second revolution 120. When this is done, there are no page refreshes, URL changes or layering changes to the host Web page displayed in the Web browser displayed on the user's computer. The user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way.

The second revolution 120 includes a first data field 122, a "Return" button 124, and a second data field 126.

Each data field 122, 126 may comprise textual data, one or more image files, one or more hyperlinks, streaming video, or any combination thereof. Image files may be in jpeg, gif, animated gif, or any other convenient format.

The first and second data fields 122, 126 may each comprise standard provider data, such as a simple standard text message, or customized data sent to the user based upon user data provided in either or both of the first and second data entry fields 112, 114 of the first revolution 110.

Advantageously, when the first and second data fields 122, 126 each comprise only standard provider data, the entire evolving interactive dialog box 100 comprising the first and second revolutions 110, 120 may have a fixed layout and may be communicated in its entirety to a Web browser installed on the user's computer together with the host Web page.

In one embodiment, a response in either or both of the data fields 122, 126 is selected from a plurality of predefined possible responses based upon user data provided in either or both of the first and second data entry fields 112, 114 of the first revolution 110. For example, the user data may be scanned to detect the presence of one or more preassigned keywords. Depending upon which if any keywords are detected in the user data, one or more predetermined hyperlinks for corresponding Web pages may be provided in the response. For example, the word "book" may be a preassigned keyword. In that case, the user data is scanned to determine if it includes the word "book" and if it does, then a plurality of predetermined hyperlinks to Web sites which sell books are selected and included in the response data field 126.

In another embodiment, a response in one or both of the data fields 122, 126 is customized for the user by including in the response user data provided in either or both of the first and second data entry fields 112, 114 of the first revolution 110. For example, the response field 126 may include the user's e-mail address provided in the second data entry field 114, or the user's name or any other personal information entered in the first data entry field 112.

When a user clicks on the "Return" button 124, the evolving interactive dialog box returns to the first revolution 110.

The first embodiment evolving interactive dialog box 100 is particularly well suited to applications wherein a user may request some information or an item from a Web site while the user is browsing and interacting with a Web page of the Web site. In that case, the user may explain what they are seeking in the first data entry field 112, provide an e-mail address in the second data entry field 114, and the Web site operator may later send a message to the user's e-mail address informing him/her of how to obtain whatever it was they were seeking. However, it should be understood that many other applications are possible.

Figure 2A:
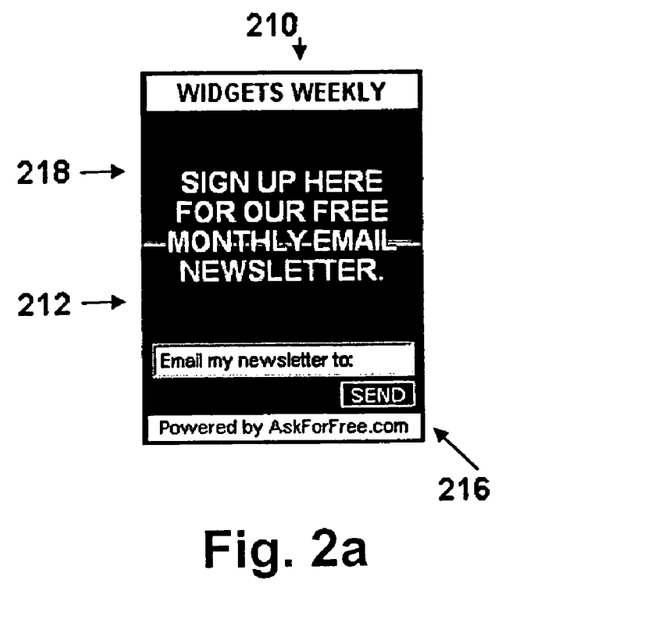
FIGS. 2A and 2B show a second preferred embodiment of an evolving interactive dialog box for a Web page.
Figure 2B:
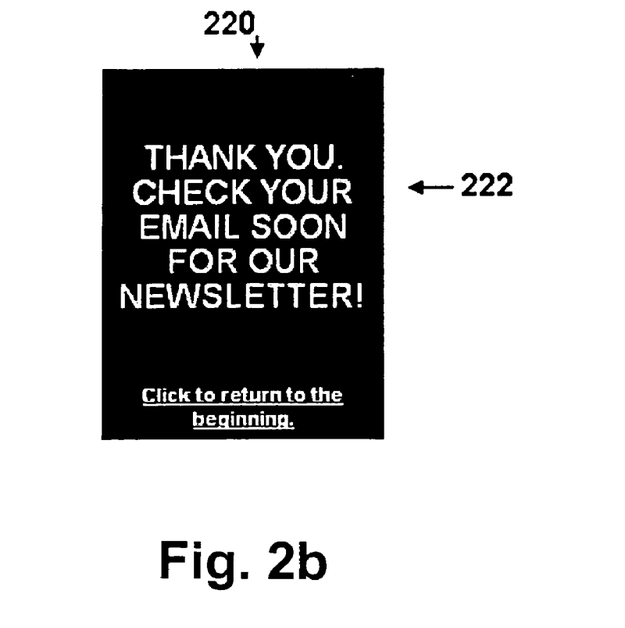

FIGS. 2A and 2B show a second preferred embodiment of an evolving interactive dialog box 200 for a Web page. The evolving interactive dialog box 200 has two revolutions 210 and 220.

The first revolution 210 beneficially includes a data entry field 212, a "Send" button 216, and provider data field 218. The provider data field 218 may be a simple standard text message. Beneficially, the data entry field 212 is a text entry box wherein a user supplies an e-mail address where the user may receive e-mail.

When a user clicks on the "Send" button 216, the first revolution 210 of the evolving interactive dialog box 200 is replaced in place in a host Web page with the second revolution 220. That is, the user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way.

The second revolution 220 beneficially includes data field 222. The data field 222 may comprise textual data, one or more image files, one or more hyperlinks, or any combination thereof. Image files may be in jpeg, gif, animated gif, or any other convenient format. The data field 222 may comprise standard provider data, such as a simple standard text message, or customized data sent to the user based upon user data provided in the data entry field 212 of the first revolution 210, as described in more detail above with respect to the first embodiment shown to FIGS. 1A–B.

The second embodiment evolving interactive dialog box 200 is well suited to signing-up Web site visitors to receive free e-mail newsletters. The second embodiment evolving interactive dialog box 200 is also particularly well suited to applications wherein a Web site is sponsoring a sweepstakes. In that case, the user may simply enter the sweepstakes by providing an e-mail address in the data entry field 212. The sponsoring Web site provider may then collect the e-mail addresses of all sweepstakes entrants. This provides the sponsoring Web site provider with a list of site visitors which can be used for various marketing purposes. However, it should be understood that many other applications are possible.

Figure 3A:
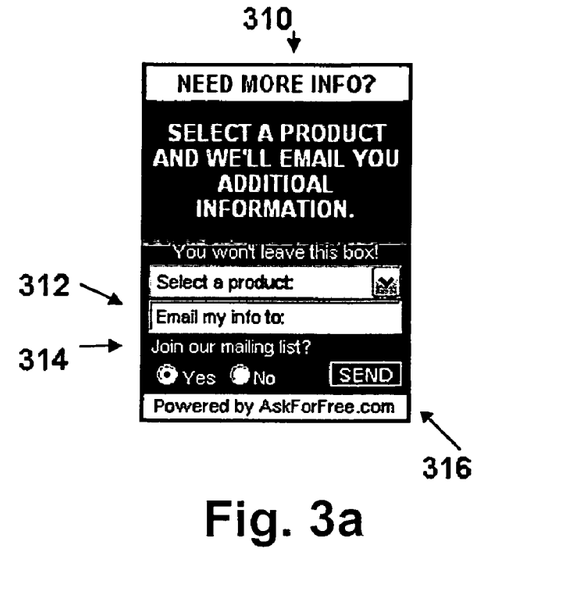
FIGS. 3A and 3B show a third preferred embodiment of an evolving interactive dialog box for a Web page.
Figure 3B:
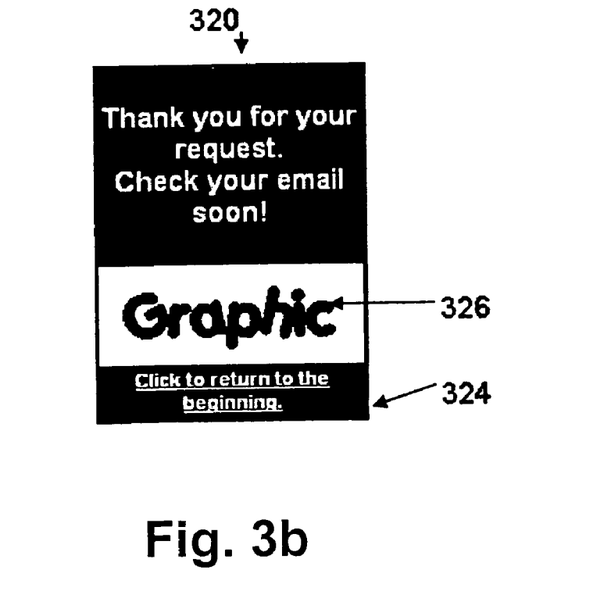
Figure 4A:
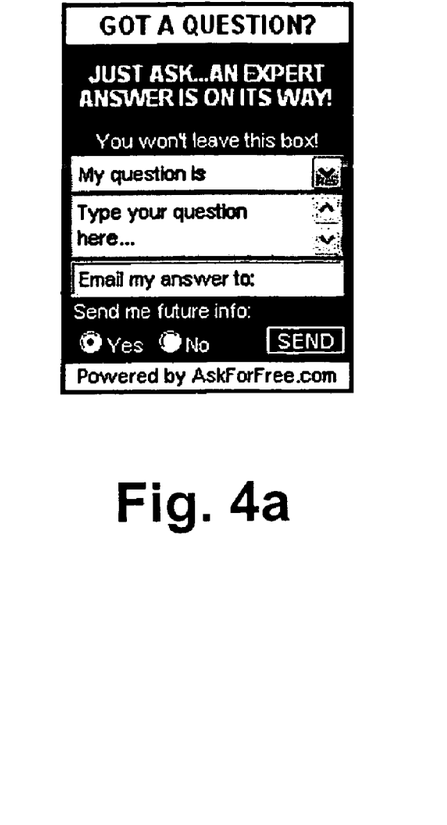
FIGS. 4A and 4B show a fourth preferred embodiment of an evolving interactive dialog box for a Web page.
Figure 4B:
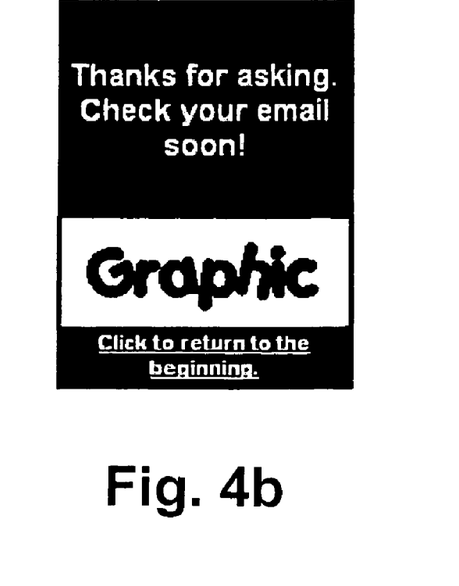
Figure 5A:
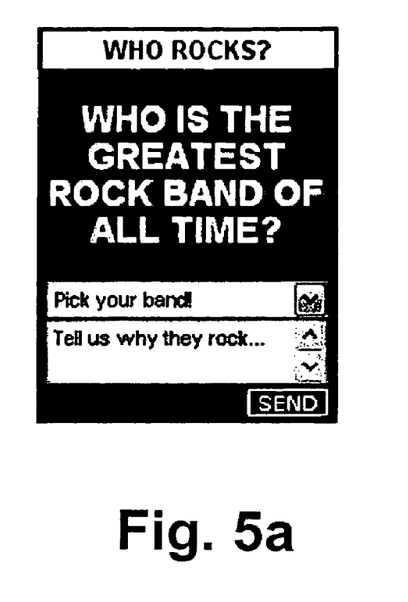
FIGS. 5A and 5B show a fifth preferred embodiment of an evolving interactive dialog box for a Web page.
Figure 5B:
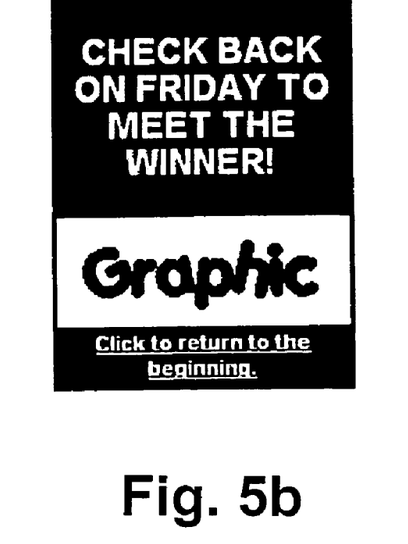
Figure 6A:
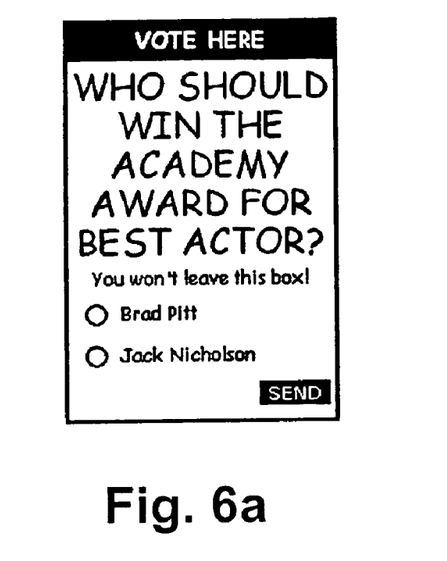
FIGS. 6A and 6B show a sixth preferred embodiment of an evolving interactive dialog box for a Web page.
Figure 6B:
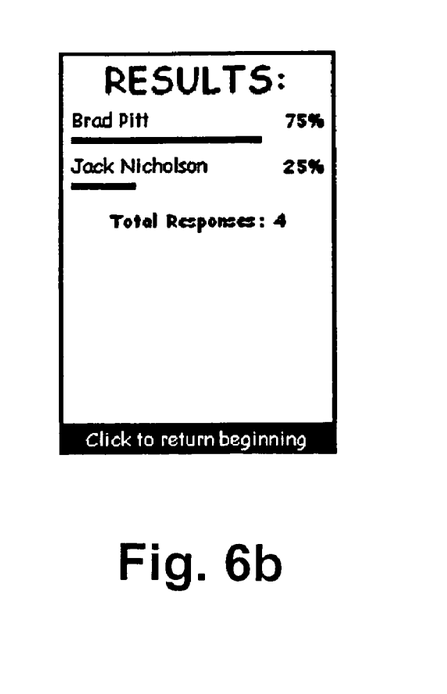
Figure 7A:
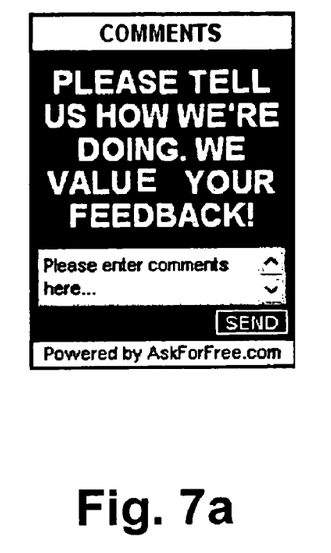
FIGS. 7A and 7B show a seventh preferred embodiment of an evolving interactive dialog box for a Web page.
Figure 7B:
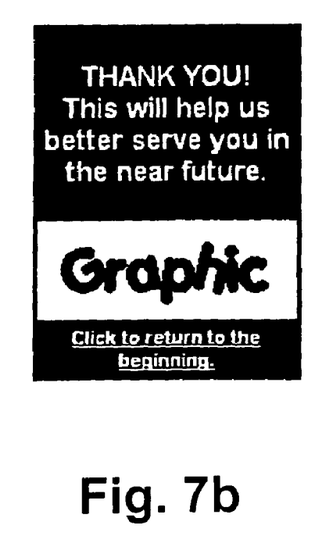

FIGS. 3A and 3B show a third preferred embodiment of an evolving interactive dialog box 300 for a Web page. The evolving interactive dialog box 300 has two revolutions 310 and 320.

The first revolution 310 beneficially includes a data entry field 312, a data entry field 314, a "Send" button 316, and provider data field 318. The data entry field 312 comprises a category menu. Beneficially, the data entry field 312 comprises a pull-down menu and the second data entry field 314 is a text entry box wherein a user supplies an e-mail address where the user may receive e-mail. Preferably, the data entry field 312 lists categories, items, products, etc. in which a user may be expected to have some interest. These categories may be selected based upon subject matter of a host Web page or Web site wherein the evolving interactive dialog box 300 is included.

When a user clicks on the "Send" button 316, the first revolution 310 of the evolving interactive dialog box 300 is replaced in place in a host Web page with the second revolution 320. That is, the user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way.

The second revolution 320 beneficially includes a first data field 322, a "return" button 324, and a second data field 326. Each data field 322, 326 may comprise textual data, one or more image files, one or more hyperlinks, or any combination thereof. Image files may be in jpeg, gif, animated gif, or any other convenient format. The first and second data fields 322, 326 may each comprise standard provider data, such as a simple standard text message, or customized data sent to the user based upon user data provided in either or both of the category menu comprising the data entry field 312 and/or the data entry field 314 of the first revolution 310, as described in more detail above with respect to the first embodiment shown in FIGS. 1A–B.

When a user clicks on the "return" button 324, the evolving interactive dialog box returns to the first revolution 310. That is, the second revolution 320 of the evolving interactive dialog box 300 is replaced in place in a host Web page with the first revolution 310.

Operation of another example of the evolving interactive dialog box 300 will now be explained. For example, the host Web page for the evolving interactive dialog box 300 includes samples of various traditional jazz music recordings. In that case, the category menu comprising the data entry field 312 may list a variety of music genres which may also interest a visitor to the Web page. A user may select one of these genres through the category menu, e.g. jazz-fusion, and provide an e-mail address in the date entry field 314.

When the user clicks on the "Send" button 316, the user's selection (jazz-fusion) and e-mail address are communicated to a sponsor, and may be stored in a database of the provider. The Web site provider may then send to the user's e-mail address samples of various jazz-fusion recordings, as well as offers for the user to purchase full jazz-fusion recordings or to purchase a membership allowing him/her to download jazz-fusion recordings.

Also, when the user clicks on the "Send" button 316, the first revolution 310 of the evolving interactive dialog box 300 is replaced in place in a host Web page with the second revolution 320. The standard provider data field 322 of the second revolution may include a message informing the user that samples have been or will be sent to the e-mail address. Meanwhile, the response data field 326 may include a photo of a musical group or album cover for a jazz-fusion recording, and/or one or more hyperlinks for one or more URLS for Web pages offering jazz-fusion music recordings. Optionally, an audio file may be transmitted to a user's computer together with the second revolution, and a browser on the user's computer may automatically launch an audio player and play the audio file through the audio system of the user's computer. In that case, the audio file may comprise a jazz-fusion musical sample. The "return" button 324 of the second revolution 324 may be labeled "Click to sign up for more music" and when a user selects it, then the second revolution 320 of the evolving interactive dialog box 300 is replaced in place in a host Web page with the first revolution 310.

In general, as disclosed herein, an evolving interactive dialog box can have any combination of three types of data entry fields, loosely termed herein: (1) a general textual data entry field; (2) a category (pull-down) menu data entry field; and (3) a contact information (e.g., e-mail address) data entry field. Evolving interactive dialog boxes may be constructed with any number of revolutions each having any combination of these four fields. For example, revolution 110 of evolving interactive dialog box 100 contains data entry fields (1) and (3). Meanwhile, revolution 210 of evolving interactive dialog box 200 only contains data entry field (3) only, and revolution 310 of evolving interactive dialog box 300 contains data entry fields (2) and (3).

Accordingly, with the three types of data entry fields, there are seven possible combinations of evolving interactive dialog boxes, as shown in the embodiments of FIGS. 1–7. The explanation of the operation of the embodiments shown in FIGS. 4–7 is similar to that explained above with respect to FIGS. 1–3 and will not be repeated here.

Additionally, each variation of the evolving interactive dialog box may optionally include either or both: (a) an opt-in/opt-out button; and (b) an additional standard provider data field. For example, the embodiments shown in FIGS. 3 and 4 include the opt-in/opt-out button, while the embodiments in FIGS. 1, 2, 3, 4 and 5 include the additional standard provider data field (footer).

An evolving interactive dialog box may have dynamically-assigned features such font type, font size, text color, box shape, box dimension(s), background colors, foreground colors, etc. These characteristics may be customized to match a host Web page in which the evolving interactive dialog box is included.

Figure 10A:
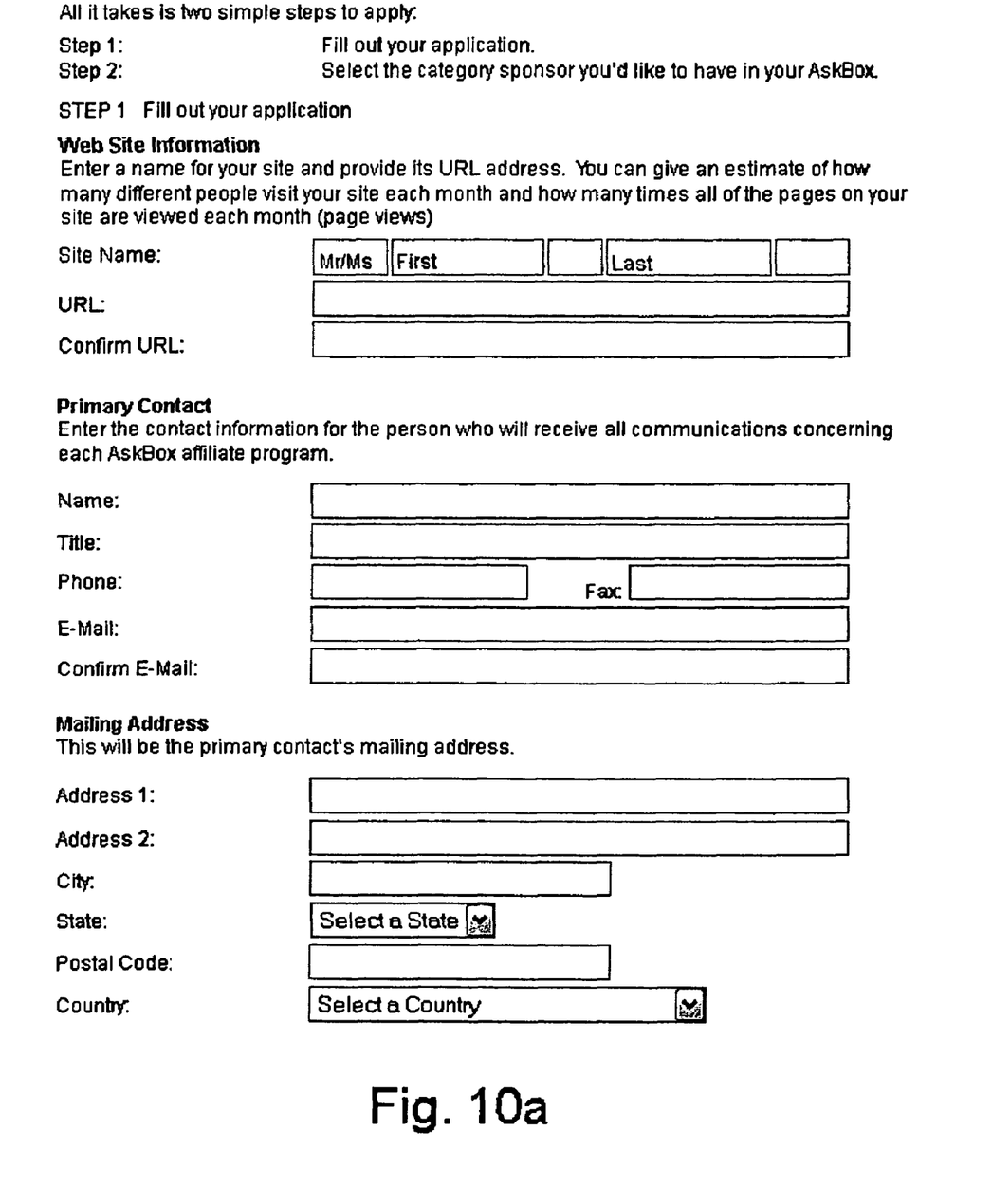
FIGS. 10a–c illustrate a data entry form for creating an evolving interactive dialog box having selected characteristics.
Figure 10B:
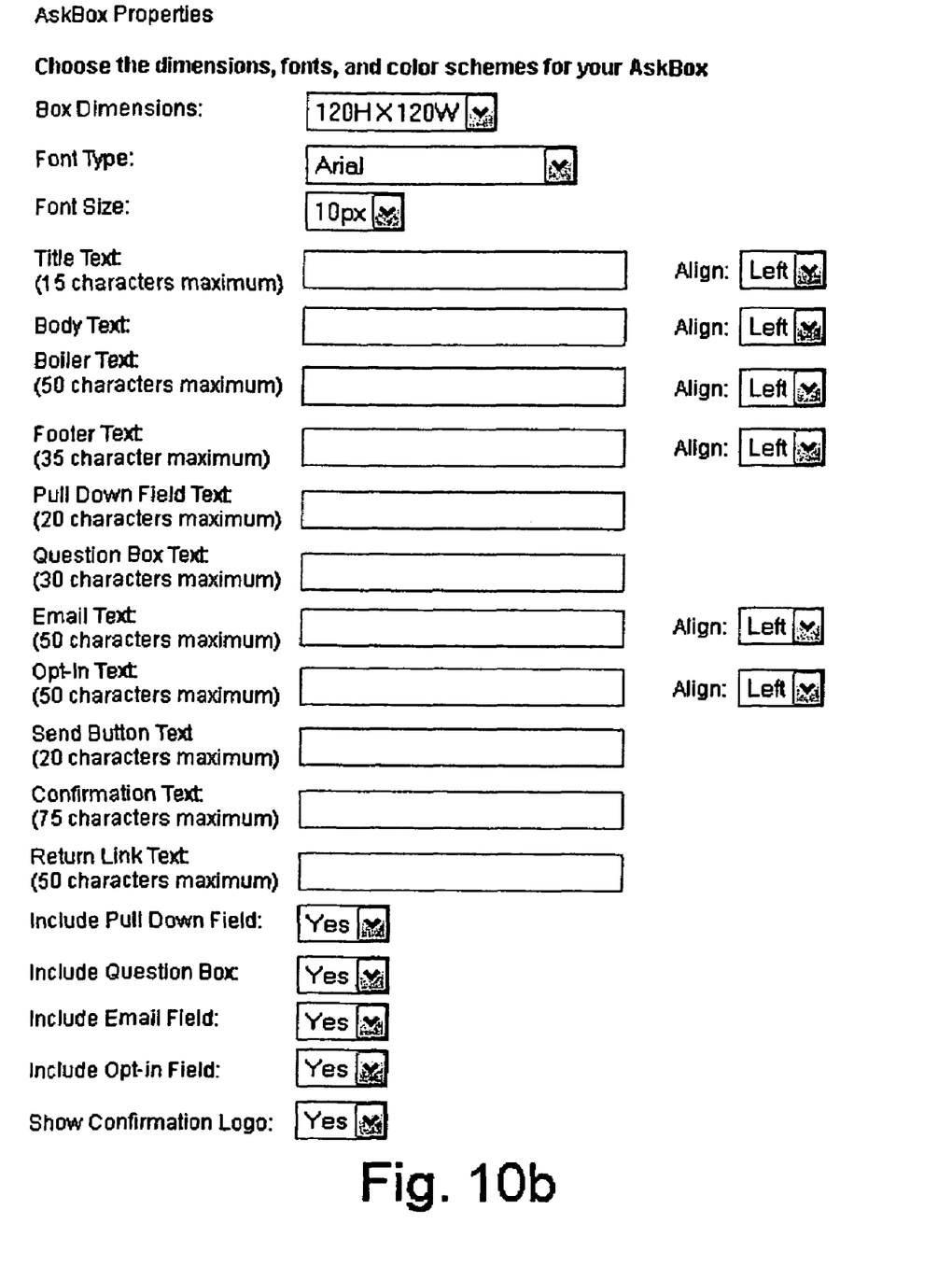
Figure 10C:
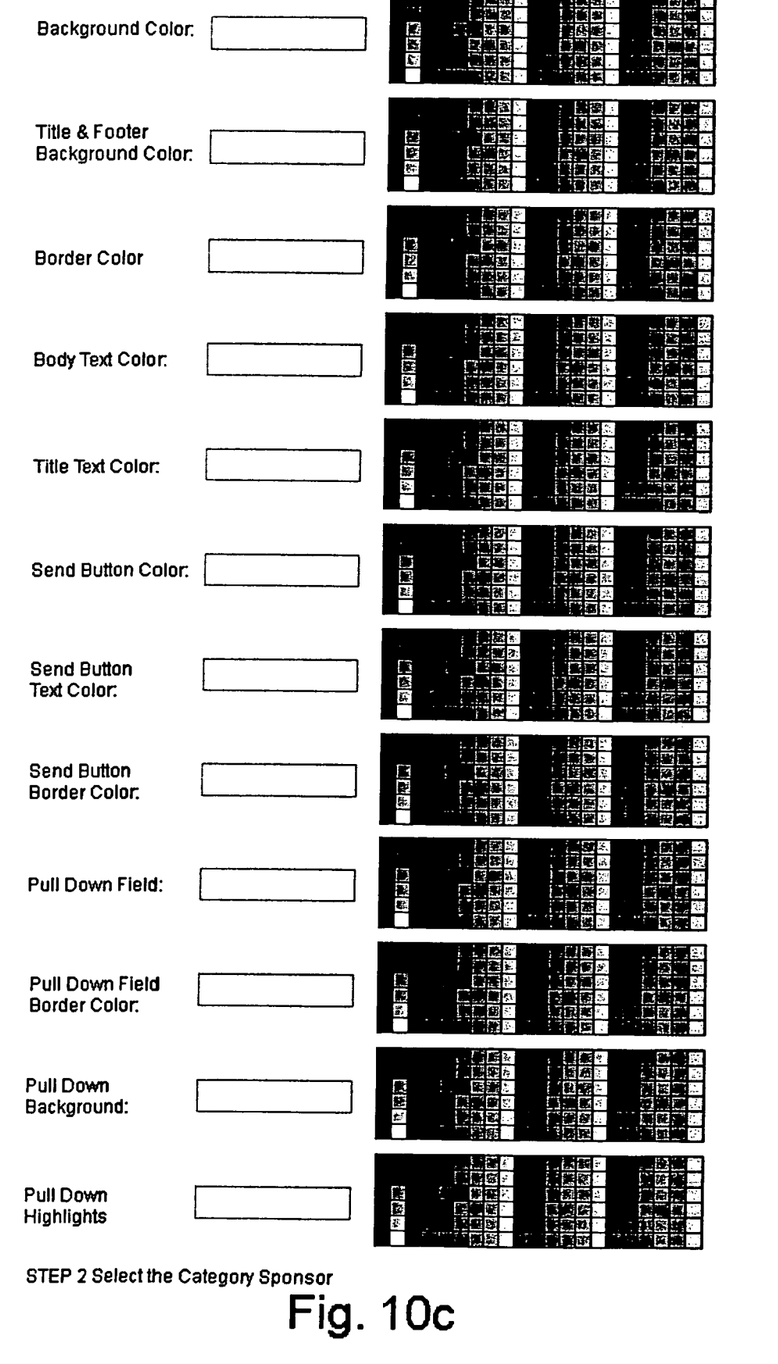

In that case, a representative or operator of a Web site desiring to include an evolving interactive dialog box on a Web page of that Web site may establish a computer connection with an origination Web site for creating the evolving interactive dialog box. The representative or operator may then fill out an on-line form for selecting customized characteristics for the evolving interactive dialog box. An exemplary form for creating an evolving interactive dialog box with dynamically selected characteristics is shown in FIG. 10. Upon submitting the completed form, an automated backend process may create Web browser readable code (e.g., DHTML code) for the evolving interactive dialog box and supply this code to the representative or operator. This code may be supplied in a variety of different ways, including an e-mail message, being posted at a URL where it may be downloaded, etc. The representative or operator may then include the code for the evolving interactive dialog box in the code for the host Web page where the evolving interactive dialog box is intended to appear.

The evolving interactive dialog box may support a variety of interactive services, including interactive audio, audio-video, or telephony/video-telephony services. For example, a first revolution of the evolving interactive dialog box may include a data entry box wherein a user may supply a telephone number for establishing a telephony connection. Upon entering the telephone number and clicking a "dial" button, the first revolution may be replaced in place by a second revolution including a streaming video window for displaying the video of a video-telephony call. Many such interactive and multimedia services may be provided on a host Web page through an evolving interactive dialog box, all without disturbing a remainder of the host Web page.

Figure 8:
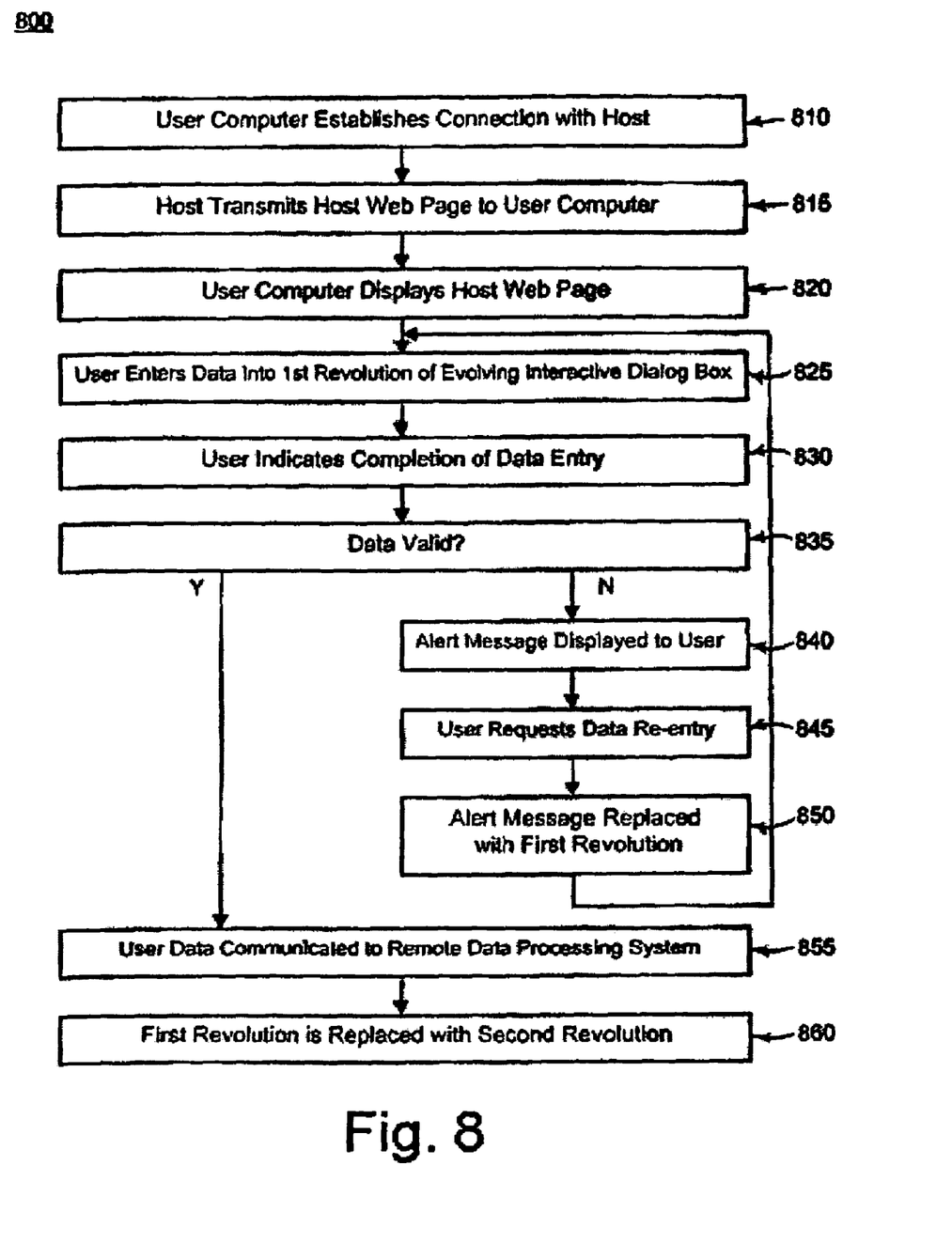
FIG. 8 is a flowchart of a preferred embodiment process for processing data submitted by an Internet user via an evolving interactive dialog box.

An exemplary operation of an evolving interactive dialog box will be explained with respect to the flowchart of FIG. 8, illustrating a preferred embodiment of a process 800 for processing data from an Internet user via an evolving interactive dialog box, such as the exemplary evolving interactive dialog box 300.

Figure 9:
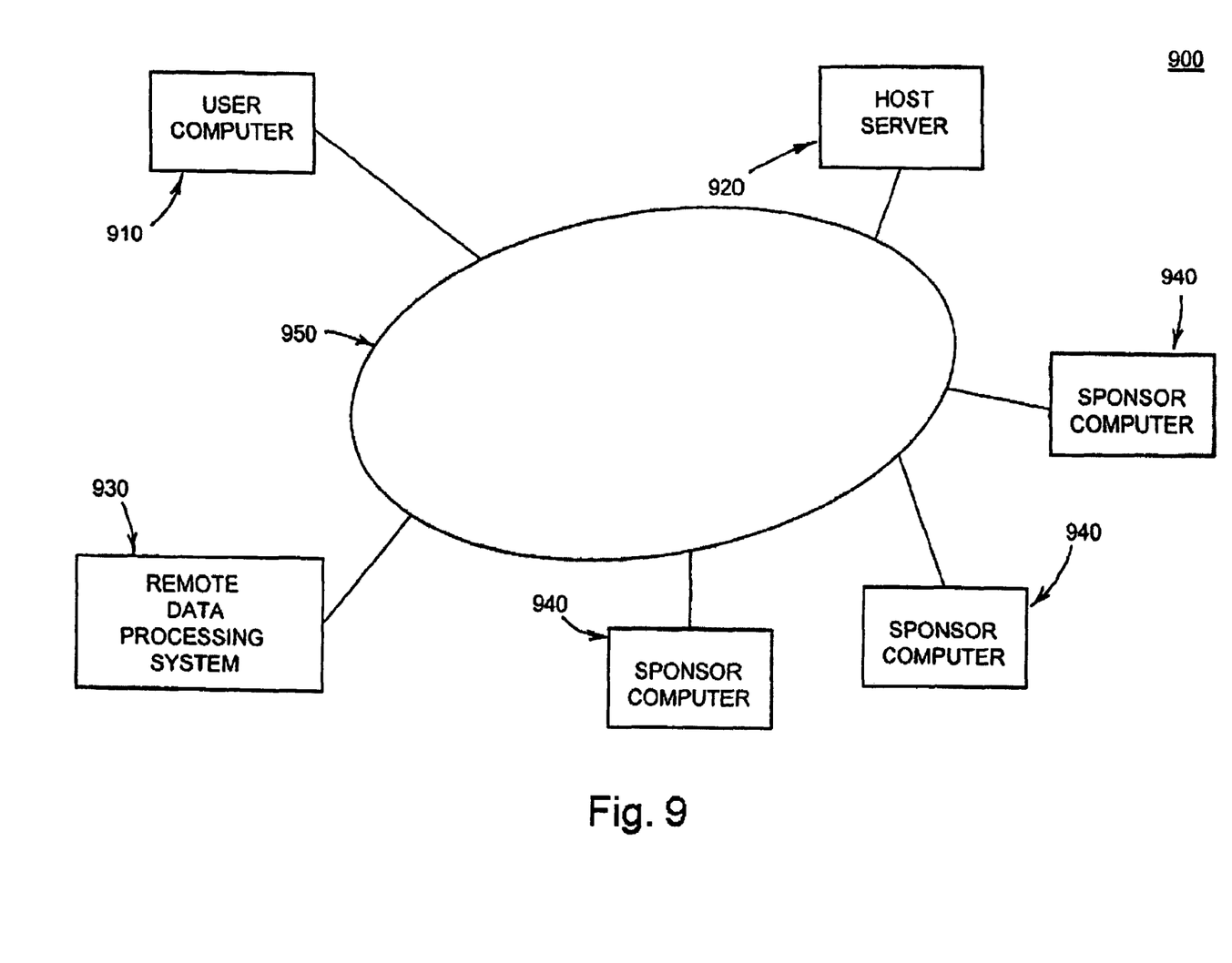
FIG. 9 illustrates an exemplary system for processing user data received from a user computer via an evolving interactive dialog box.

The process 800 may be better understood with reference to the block diagram of FIG. 9 illustrating an exemplary system 900 for processing user data received from a user computer. The system 900 comprises a user computer 910, a host server 920 for providing a host Web page, a remote data processing system 930, and one or more sponsor computers 940 all connected via the Internet 950. The remote data processing system 930 preferably includes: at least one server computer for receiving and transmitting information via the Internet, and at least one database for storing user data received from a user computer 910. The remote data processing system 930 may be combined with a sponsor computer 940 through a same Internet connection.

In a first step 810, a user computer 910 establishes an Internet connection with a host Web site, which may be provided by the host server 820, and requests transmission of a host Web page which includes an evolving interactive dialog box, such as the evolving interactive dialog box 300.

In a second step 815, the host Web site transmits the host Web page across the Internet to the user computer 810 for display on a display screen by a Web browser resident on the user computer 810.

In a preferred embodiment, the host Web site transmits together with the host Web page first and second dialog boxes, or revolutions, of an evolving interactive dialog box, such the evolving interactive dialog box 300.

In a next step 820, the Web browser of the user computer displays the host Web page. Displayed in a predetermined location of the host Web page is a first revolution 310 of the evolving interactive dialog box 300. Alternatively, in another embodiment, a simple clickable box may be displayed on the host Web page. The clickable box may include text, such as "Contact us" or "Help." When the user clicks on the clickable box, the first revolution 310 of the evolving interactive dialog box 300 may be displayed.

In a preferred embodiment, the host Web page is implemented using DHTML and displays the evolving interactive dialog box 300 with dynamically selected features such as box shape, colors, text, categories, etc. Although DHTML is used in the preferred embodiment, other implementations are possible, including JAVA® or FLASH®-based implementations. DHTML has advantages over JAVA® in that the application is loaded together with the host Web page, and therefore runs more quickly. Also, DHTML is more stable across browsers and operating systems than a JAVA® Virtual Machine.

In a next step 825, a user interacts with the first revolution 310 of the evolving interactive dialog box 300 by selecting a category from a pull-down menu of a data entry field and by supplying an e-mail address.

In a next step 830, the user indicates that the user data has been completely entered into the data entry fields of the first revolution. Preferably, the user makes this indication by clicking on the "Send" button 316 shown in FIG. 3.

In a next step 835, a data validity check is performed on the user data entered in the first revolution. Preferably, the validity check is tailored to the nature of the user data. For example, where the user data is an e-mail address entered in a contact information data entry field, a validity check may be performed on the e-mail address, or perhaps just the root domain name of the e-mail address. Alternatively, where the user data is simply user feedback in a general textual data entry field of the first revolution, the data may simply be checked to determine whether it is blank or missing, indicating that the user inadvertently clicked on a button to submit the date before it was entered. Many such variations of data validity checks may be performed as appropriate.

If the validity check indicates that there is a problem with the data submitted in the first revolution (e.g., data entry fields lacking any entered data), then in a step 840 the first revolution of the evolving interactive dialog box is replaced in place in the host Web page with a "third" dialog box or revolution, alerting the user that the user data is invalid, and preferably notifying the user of which data entry fields have not been filled-in, or that there is an invalid e-mail address, etc. The term "third" revolution as used above is simply used for aid in distinguishing the dialog box containing the alert message from the normal first and second revolutions, and does not in any way connote an order in which the revolutions are displayed. Indeed, if the user enters valid data, the "third" revolution is never displayed.

In a step 845 the user may click a button in the "third" revolution to return to the first revolution and reenter valid data in the appropriate data entry field(s). In that case, in a step 850 the "third" revolution of the evolving interactive dialog box is replaced in place in the host Web page with the first revolution, and the process continues at the step 825 above.

If the validity check indicates that the user data supplied in the first revolution of the evolving interactive dialog box is valid, then in a next step 855 a category ID for the category selected by the Internet user and the user's e-mail address are communicated via the Internet to the remote data processing system 930.

In a step 860, which may be performed before, during, or subsequent to the step 855, the first revolution of the evolving interactive dialog box is replaced in place in the host Web page with a second revolution such as the second revolution 320 of FIG. 3.

Advantageously, display of the remainder of the host Web page on the user computer is not affected by the revolution of the evolving interactive dialog box. The user's Web browser is not pointed away from the host Web page which the user is viewing, nor does a second Web browser window, or a "pop-up box," open on the user's computer display screen. Thus, the user is able to interact with the evolving interactive dialog box without having the user's view of the remainder of the host Web page altered in any way. When the user is executing a process involving the evolving interactive dialog box, the user's Web browser remains loaded with the host Web page at all times.

In one embodiment, the second revolution 320 includes an acknowledgment of the user data entered in that first revolution. The second revolution may also include a "Return" button to allow the Internet user to return to the first revolution and step 825 above enter additional user data, such as an additional category.

While preferred embodiments are disclosed herein, many variations are possible which remain within the concept and scope of the invention. For example, in the method for processing a question received from an Internet user via the Internet, the interrogation processing system may set an alarm when it receives a question from a user. In that case, interrogation processing system may send a prompt to the selected sponsor if it has not received a reply to the question from the sponsor within a predetermined time interval. Such variations would become clear to one of ordinary skill in the art after inspection of the specification, drawings and claims herein. The invention therefore is not to be restricted except within the spirit and scope of the appended claims.

What is claimed is:

1. A method of conducting an electronic commerce transaction using an interactive dialog box, comprising:

provi­ding an interactive dialog box with a plurality of revolutions in a host web page;

displaying an electronic order form as a first revolution of the interactive dialog box;

receiving user data entered into the first revolution of the interactive dialog box;

displaying a second revolution of the interactive dialog box in response to user data entered into the first revolution of the interactive dialog box, the second revolution being displayed without altering the remainder of the host web page; and processing an electronic commerce transaction based on the received user data.

2. The method of claim 1, wherein the electronic order forms comprises a pull-down menu for selecting products and services.

3. The method of claim 1, wherein the first revolution further comprises a data entry box.

4. The method of claim 1, further comprising:
communicating the received user data to a remote information processing system.

5. The method of claim 1, wherein the second revolution comprises a message confirming receipt of the received user data.

6. An article of manufacture comprising at least one machine readable storage medium having one or more computer programs stored thereon, the computer programs when executed by one or more computing systems cause the computing systems to:

provide an interactive dialog box with a plurality of revolutions in a host web page;

display an electronic order form as a first revolution of the interactive dialog box;

receive user data entered into the first revolution of the interactive dialog box;

display a second revolution of the interactive dialog box in response to user data entered into the first revolution of the interactive dialog box, the second revolution being displayed without altering the remainder of the host web page; and process an electronic commerce transaction based on the received user data.

7. The article of manufacture of claim 6, wherein the electronic order form comprises a pull-down menu for selecting products and services.

8. The article of manufacture of claim 6, wherein the first revolution further comprises a data entry box.

9. The article of manufacture of claim 6, being further operable to communicate the received user data to a remote information processing system.

10. The article of manufacture of claim 6, wherein the second revolution comprises a message confirming receipt of the received user data.

11. A host web site system including a readable storage medium having one or more computer programs stored thereon, the one or more computer programs when executed by one or more computing systems cause the computing systems to affect the host web site to:

provide an interactive dialog box with a plurality of revolutions in a host web page;

display an electronic order form as a first revolution of the interactive dialog box;

receive user data entered into the first revolution of the interactive dialog box;

display a second revolution of the interactive dialog box in response to user data entered into the first revolution of the interactive dialog box, the second revolution being displayed without altering the remainder of the host web page; and process an electronic commerce transaction based on the received user data.

12. The host web site system of claim 11, wherein the electronic order form comprises a pull-down menu for selecting products and services.

13. The host web site system of claim 11, wherein the first revolution further comprises a data entry box.

14. The host web site system of claim 11, being further operable to communicate the received user data to a remote information processing system.

15. The host web site system of claim 11, wherein the second revolution comprises a message confirming receipt of the received user data.

* * * * *